United States Patent

Wolfe

[15] 3,706,907

[45] Dec. 19, 1972

[54] DEFLECTION CIRCUIT WITH MEANS FOR GENERATING CORRECTION WAVEFORM

[72] Inventor: Paul G. Wolfe, Oreland, Pa.

[73] Assignee: Philco-Ford Corporation, Philadelphia, Pa.

[22] Filed: May 1, 1970

[21] Appl. No.: 33,640

[52] U.S. Cl. ....................315/27 GD, 315/24, 315/26
[51] Int. Cl. ....................H01j 29/70
[58] Field of Search ....................315/26, 24, 27 GD

[56] References Cited

UNITED STATES PATENTS

| | | | |
|---|---|---|---|
| 2,649,555 | 8/1953 | Lockhart | 315/27 GD X |
| 2,304,057 | 12/1942 | Schade | 315/27 GD X |
| 2,745,005 | 5/1956 | Lynch et al. | 315/27 GD X |

*Primary Examiner*—Benjamin A. Borchelt
*Assistant Examiner*—R. Kinberg
*Attorney*—Robert D. Sanborn, William E. Denk, Carl H. Synnestvedt and Gail W. Woodward

[57] ABSTRACT

A circuit for developing, in a deflection system for a cathode ray tube in which the electron gun is disposed at an angle other than normal to the cathode ray tube screen, a correction waveform to insure the production of a rectangular raster on the screen. A voltage waveform corresponding substantially to the uncorrected vertical deflection current waveform is applied to the vertical deflection coil through a resistor and a switch circuit which is rendered conductive during horizontal sweep intervals and non-conductive during horizontal flyback intervals of the deflection system. Energy thus supplied to the vertical deflection coil during these intervals cooperates with the inductance of the deflection coil to generate the desired correction waveform within the deflection coil. This avoids the need for specially designing the amplifying stages and the vertical deflection circuits to accommodate a modified vertical deflection waveform produced at low level and supplied to the vertical deflection coil.

7 Claims, 3 Drawing Figures

INVENTOR.
PAUL G. WOLFE

INVENTOR.
PAUL G. WOLFE

DEFLECTION CIRCUIT WITH MEANS FOR GENERATING CORRECTION WAVEFORM

BACKGROUND AND SUMMARY OF THE INVENTION

The invention relates to deflection systems for cathode ray tubes in which the electron gun is disposed at an angle other than normal to the cathode ray tube screen. More particularly it relates to means in such deflection systems for producing correction waveforms for insuring the production of a rectangular raster on the cathode ray tube screen.

In certain cathode ray tube displays the electron gun is disposed at an angle less than 90° to the cathode ray tube screen, which permits reduction in the length of the cathode ray tube. Such a tube is advantageous for example when used in a television receiver, since it makes possible a substantial reduction in the depth of the cabinet. When the electron gun is thus disposed at an angle other than normal to the cathode ray tube screen, the raster scanned by the electron beam tends to be distorted into trapezoidal form, and it is necessary to modify the vertical deflection waveform in order to maintain the raster rectangular as desired. In the past such modification customarily was effected at low levels, following which the modified wave was suitably amplified and ultimately applied to the vertical coils of the usual magnetic deflection yoke. Such arrangements suffered from the disadvantage that it was necessary to design the amplifying stages for the modified vertical deflection wave specially to accommodate the modified vertical deflection waveform, as a result of which such stages were more complicated and expensive than were required for the unmodified vertical deflection waveform.

In accordance with this invention, such disadvantage is avoided by generating the correction waveform for modifying the usual vertical deflection wave within the vertical deflection coils of the deflection yoke itself, thereby obviating the need for amplification of the modified vertical deflection waveform prior to application thereto, and the provision of specially designed amplifying means for that purpose. This is accomplished by providing suitable switching means and resistance means between a source of a voltage waveform corresponding essentially to the uncorrected vertical deflection current wave and the vertical deflection coils of the yoke, said switching means being actuatable to connect said source to said deflection coils, and means for actuating said switching means to provide a connection between the source and the vertical deflection coils during the horizontal sweep intervals of the deflection system. In this manner energy supplied from the source to the vertical deflection coils during the horizontal weep intervals is caused to cooperate with the inductance of the deflection coils to generate the desired correction current waveform within the deflection coils. The resistance means is included in the connection from the switch to the vertical deflection coils to provide the desired exponential correction waveform as will be explained later.

DESCRIPTION OF PREFERRED EMBODIMENT

Figure 1:
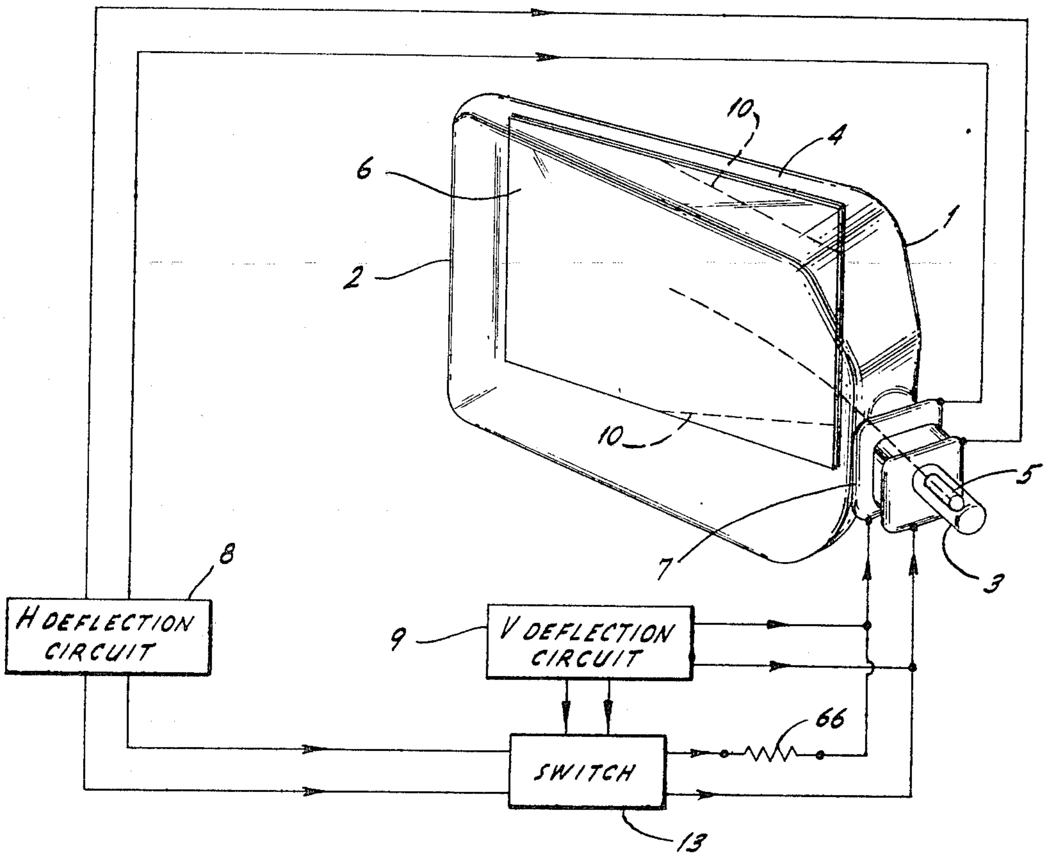
FIG. 1 illustrates a tube of the sort to which the invention is applicable and, associated therewith, a general showing of the deflection circuits and the arrangement in accordance with this invention.
Figure 2:
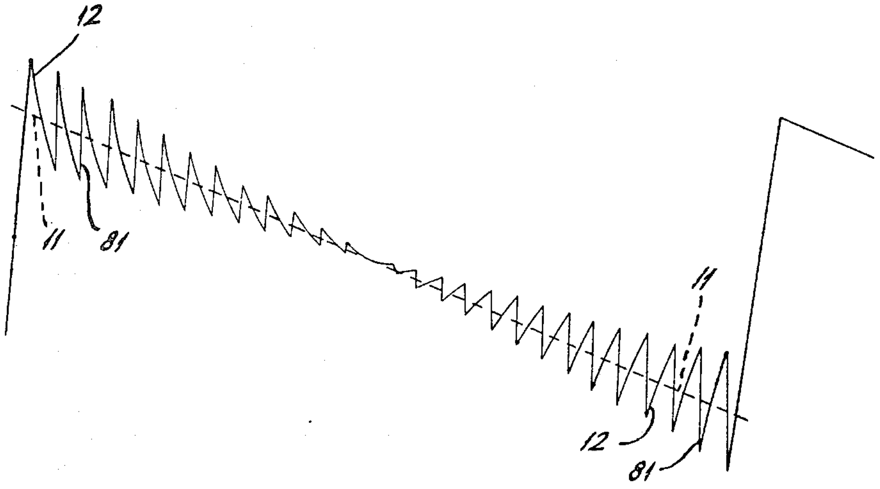
FIG. 2 illustrates the manner in which the usual vertical deflection waveform is modified in accordance with the present invention.

Referring to FIG. 1 there is shown diagrammatically a cathode ray tube 1 comprising a glass envelope 2 with a neck portion 3 disposed at an angle other than normal to the faceplate portion 4. Within the neck portion 3 is disposed an electron gun 5 which may be of the usual form adapted for directing a beam of electrons at the screen 6 disposed on the faceplate 4. Encircling the neck portion 3 is a yoke 7 of conventional form adapted to be supplied with horizontal and vertical deflection waveforms from horizontal and vertical deflection circuits 8 and 9 for producing horizontal and vertical deflection of the electron beam across the screen 6 of the cathode ray tube. If the deflection waveforms supplied by deflection circuits 8 and 9 are of the usual sawtooth form, then the desired rectangular raster will not be produced on the screen 6 because of the angle at which the electron beam approaches the screen. Rather there will be produced a trapezoidal raster, represented by the broken lines 10. In this raster, each horizontal line scanned will begin at the narrow end of the trapezoid and end at the wide end thereof. To achieve the desired rectangular raster where such horizontal scan is employed, it is necessary to modify the vertical deflection waveform in the manner shown in FIG. 2, in which the sawtooth wave 11 represents the unmodified vertical deflection waveform. The vertical deflection waveform is modified by adding to it a sawtooth wave of horizontal frequency which is of negative slope during the initial portion of the vertical deflection interval and of positive slope during the latter portion and the ramp of each tooth of which is substantially exponential in shape. In addition the correction waveform is amplitude modulated in response to the vertical deflection waveform which is of maximum amplitude at the start of the vertical deflection interval, decreases substantially linearly to zero amplitude at the center of the vertical trace, and then increases substantially linearly to maximum amplitude at the end of the vertical trace. The resultant corrected waveform is represented by the solid line 12 in FIG. 2 and will be such as to produce the desired rectangular scanning raster on the screen of the cathode ray tube if the amplitudes of the correction waveform added to the vertical deflection waveform are appropriately chosen.

In accordance with the invention the correction waveform is both produced and combined with the vertical deflection waveform 11 within the yoke 7 itself. The arrangement by which this is accomplished is shown in FIG. 1, in which a switch 13 is supplied from vertical deflection circuit 9 with a voltage waveform corresponding substantially to the unmodified vertical deflection current waveform, and is controlled in response to pulses from horizontal deflection circuit 8 at the horizontal frequency which occur during the horizontal sweep intervals to supply through resistor 66 to the vertical deflection coil of yoke 7 pulses of current at the horizontal frequency whose amplitudes are varied in accordance with the vertical deflection wave. Resistor 66 cooperates, as will be explained hereinafter, to control the waveform of the resulting sawtooth correction current produced in the vertical deflection coil.

Figure 3:
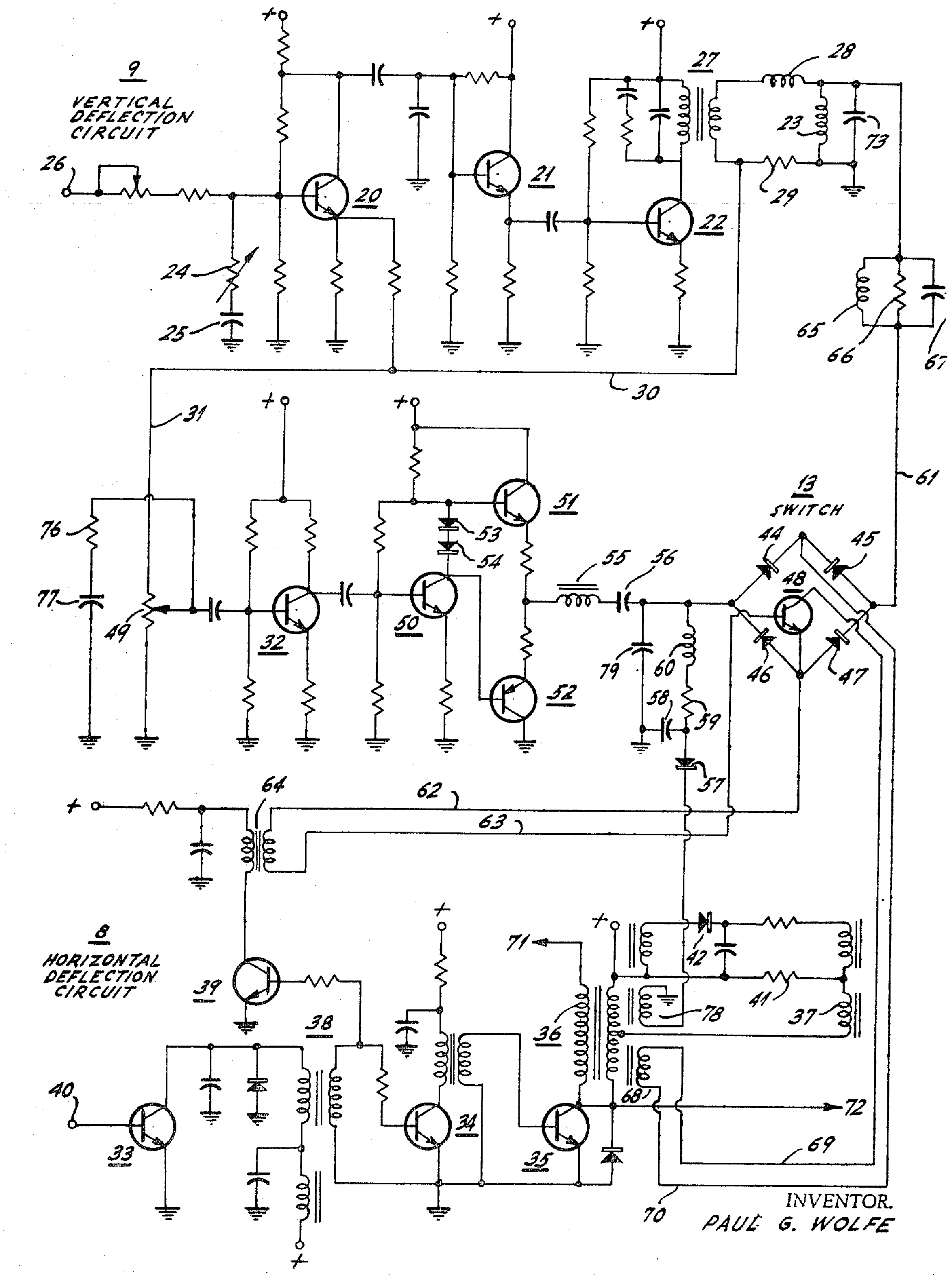
FIG. 3 is a detailed schematic diagram of a preferred embodiment of the invention.

FIG. 3 includes a showing of essentially conventional horizontal and vertical deflection circuits with which the circuits in accordance with the present invention cooperate. Accordingly these conventional circuits will be described only to the extent necessary for purposes of full disclosure of the present invention. The vertical deflection circuit 9 comprises transistor amplifier stages 20, 21 and 22 connected in more or less conventional fashion. In the input of the driver stage 20 is a series RC circuit, comprising resistor 24 and condenser 25, which is responsive to pulses at the vertical deflection frequency supplied to terminal 26 from a preceding stage to generate a vertical sawtooth wave for amplification in a driver stage 20. The output is supplied through an emitter follower stage including transistor 21 to the vertical output stage 22 having the primary of vertical output transformer 27 connected in its collector circuit. The vertical winding 23 of the deflection yoke 7 is connected in the secondary of transformer 27. Also included in the transformer secondary circuit is a choke 28 to prevent the secondary from diverting from winding 23 the horizontal-frequency signal fed to winding 23 for vertical correction in the manner described more fully hereinafter. Further the secondary circuit includes a resistor 29 as a load for providing feedback through connection 30 to the emitter of transistor 20 for linearization purposes and for providing vertical sawtooth drive through connection 31 to the input of transistor stage 32 in accordance with the invention as will be explained more fully later.

Also shown in FIG. 3 is an essentially conventional horizontal deflection circuit 8 comprising transistor stages 33, 34 and 35, horizontal output transformer 36 and horizontal deflection yoke winding 37. However, it will be noted that the output of the driver stage 33 is supplied through transformer 38 not only to driver stage 34 for supply to horizontal output stage 35, but also to a further driver stage 39 for use in accordance with the invention as will be explained later. The input to driver stage 33 supplied to terminal 40 from a preceding stage may comprise conventionally pulses at horizontal deflection frequency, as may the outputs from driver stages 34 and 39. Resistor 41, in series with horizontal yoke winding 37, provides horizontal correction time constant, while diode 42, connected to a secondary winding of transformer 36, develops d-c centering current for the horizontal yoke.

In accordance with the invention, the switch 13 supplied with a vertical deflection waveform, and actuated in response to pulses at the horizontal frequency rate to supply energy to the vertical deflection coil for generating the desired correction waveform within that winding, must be bilateral in operation in order to provide a correction waveform of one phase during the initial portion of the vertical trace, and of opposite phase during the latter portion. As shown in FIG. 3, the switch 13 may comprise a diode bridge consisting of diodes 44, 45, 46 and 47 controlled by transistor 48. The vertical deflection waveform developed across resistor 29 in series with the vertical yoke winding 23 is supplied through connections 30 and 31 to the input of a conventional transistor amplifier stage 32. The input to stage 32 may be through a potentiometer 49 which provides means for adjusting the correction waveform to the desired magnitude. Also in the input to stage 32 is an RC circuit 76, 77 which compensates for certain shortcomings in stage 32 and succeeding stages and insures that the waveform supplied to switch 13 is essentially the same as that appearing across resistor 29. The output of stage 32 is further amplified in a second conventional transistor amplifier stage 50, and then is supplied to a conventional complementary class-B stage consisting of transistors 51 and 52 and diodes 53 and 54 which cooperate to linearize the amplifier characteristics. The voltage output of this latter stage will be similar in waveform to the vertical yoke current, having a maximum value when the electron beam is at the top of the tube, and decreasing in amplitude as the beam moves toward the center of the tube. As the beam crosses the center of the tube, the amplitude goes through zero and then is reversed in phase. As the beam continues toward the bottom of the tube, the amplitude again increases in the opposite sense and reaches a maximum again as the beam reaches the bottom of the tube. This waveform is supplied through choke 55 and coupling condenser 56 to the input of the bridge circuit 13 at the junction between diodes 44 and 46. The purpose of choke 55 is to reduce feedthrough of horizontal-frequency current components from switching circuit 13 to the output of the class-B stage comprising transistors 51 and 52. Capacitor 79 provides a low-impedance return path for such horizontal-frequency current components while presenting a relatively high impedance to current components of vertical frequency. Horizontal flyback pulses from a winding 78 on horizontal output transformer 36 are rectified in a circuit comprising diode 57, condenser 58, resistor 59 and and choke 60 to supply a d-c bias to the bridge circuit 13 to correct for beam misalignment and yoke unbalance. Bridge circuit 13 is rendered conductive to supply the vertical deflection waveform, regardless of its polarity, through connection 61 to the vertical deflection winding 23 in response to pulses at the horizontal frequency occurring during the horizontal sweep interval supplied through connection 62 and 63 from the secondary of transformer 64 in the output of driver stage 39. In connection 61 from the output of the bridge circuit to the vertical deflection yoke winding 23 there may be included a circuit for modifying or shaping the correction waveform supplied to the vertical yoke winding, which in this instance comprises choke 65, resistor 66 and capacitor 67. A small secondary winding 68 on the horizontal output transformer 36 is connected through connections 69 and 70 in series with the collector of the switch transistor 48 for supplying a positive bias to diode bridge circuit 13 during horizontal trace time which is just below the knee of the diode characteristics, and which serves to provide a more linear characteristic in the diode switch circuit. Further it is noted that, in the horizontal deflection circuit as shown in FIG. 3, outputs 71 and 72 are indicated for deriving operating voltages for the cathode ray tube in the usual manner. Since the circuits for developing these voltages are not pertinent to the present invention, they are not illustrated in FIG. 3.

In operation, the switch transistor 48 will be rendered conductive in response to positive pulses at the horizontal scanning frequency supplied to its base and emitter through connections 62 and 63 during horizontal scan. When thus rendered conductive, if the vertical voltage waveform supplied to the input of the bridge is of positive polarity, conduction will occur through diodes 44 and 47 and through the collector-emitter circuit of the transistor. If, on the other hand, the vertical voltage waveform supplied to the bridge input is of negative polarity, conduction will occur through diodes 46 and 45 and the same collector-emitter circuit of transistor 48. As a result of such action, there will be supplied through connection 61 to the vertical deflection yoke winding 23 pulses of current at the horizontal frequency which vary in amplitude and polarity in response to the modulating action of the vertical deflection waveform supplied to the input of the the bridge switching circuit. These cooperate with the yoke winding inductance to develop the desired correction waveform. Owing to the presence of the correction circuit comprising resistor 66, inductor 65 and capacitor 67, the correction waveform will have the desired exponential from during the scan intervals needed to achieve the desired rectangular raster. Capacitor 73 in shunt with the vertical deflection coil 23 is chosen to resonate with the vertical deflection coil at a period equal to twice the horizontal flyback time to produce in coil 23 the necessary correction current reversal, shown at 81 in FIG. 2, during the usual horizontal flyback interval.

I claim:

1. In a deflection system for a cathode ray tube employing an electron gun disposed at an angle other than normal to the cathode ray tube screen, said system comprising:

- a vertical deflection coil,
- means for supplying a vertical deflection current wave to said vertical coil,
- a horizontal deflection coil, and
- means for supplying a horizontal deflection wave to said horizontal coil,
- means for supplying to said vertical coil a correction current waveform to produce a substantially rectangular raster on the cathode ray tube screen despite the orientation of said electron gun, said means comprising:
- a source of a voltage waveform corresponding essentially to said vertical deflection wave, switch means having a terminal,
- direct-current-conductive means for directly connecting said terminal to said vertical coil,
- said switch means having another terminal coupled to said source and being actuatable to connect said source to said vertical coil via said direct-current-conductive means, and
- means for actuating said switch means to effect said connection at intervals corresponding to the horizontal scan intervals of said deflection system,
- whereby energy supplied from said source to said vertical coil during said horizontal scan intervals cooperates with the inductance of said coil to generate the desired correction waveform with said coil.

2. Apparatus according to claim 1 in which said direct-current-conductive means is adapted to modify the waveform supplied to said coil to produce a correction wave of substantially exponential form.

3. Apparatus according to claim 2 in which said direct-current-conductive means comprises resistance means connected in series with said vertical deflection coil.

4. In a deflection system for a cathode ray tube employing an electron gun disposed at an angle other than normal to the cathode ray tube screen, said system comprising:

- a vertical deflection coil,
- means for supplying a vertical deflection current wave to said vertical coil,
- a horizontal deflection coil, and
- means for supplying a horizontal deflection wave to said horizontal coil,
- means for supplying to said vertical coil a correction current waveform to produce a substantially rectangular raster on the cathode ray tube screen despite the orientation of said electron gun, said means comprising:
- a source of a voltage waveform corresponding essentially to said vertical deflection wave,
- switch means actuatable to connect said source to said vertical coil, said switch means comprising a diode bridge circuit having diagonally opposite input and output terminals, and a controllably conductive device connected between another pair of diagonally opposite terminals of said bridge circuit, the diodes of two opposite arms of said bridge circuit being so poled as to provide a conductive path including said controllably conductive device for one polarity of waveform supplied to said input terminals, and the diodes in the other two opposite arms of said bridge circuit being so poled as to provide a conductive path including said controllably conductive device for the opposite polarity of waveform supplied to said input terminal, and
- means for actuating said switch means to effect said connection at intervals corresponding to the horizontal scan intervals of said deflection system,
- whereby energy supplied from said source to said vertical coil during said horizontal scan intervals cooperates with the inductance of said coil to generate the desired correction waveform within said coil.

5. Apparatus according to claim 4 in which said controllably conductive device comprises a transistor having its emitter-collector circuit connected between said other pair of bridge circuit terminals, and having pulses at the horizontal deflection rate supplied between its emitter and base to render it conductive during the occurrence of said pulses.

6. Apparatus according to claim 5 in which said means for supplying a horizontal deflection wave to said horizontal deflection coil includes a horizontal output transformer, said transformer including a winding connected in the emitter-collector circuit of said transistor to provide a bias for the diodes in said bridge circuit.

7. In a deflection system for a cathode ray tube employing an electron gun disposed at an angle other than normal to the cathode ray tube screen, said system comprising:

- a vertical deflection coil, means for supplying a vertical deflection current wave to said vertical coil, a horizontal deflection coil, and means for supplying a horizontal deflection wave to said horizontal coil, means for supplying to said vertical coil a correction current waveform to produce a substantially rectangular raster on the cathode ray tube screen despite the orientation of said electron gun, said means comprising:

a source of an alternating-polarity voltage waveform corresponding essentially to said vertical deflection wave, bilaterally conductive switch means having a terminal, direct-current-conductive means for directly connecting said terminal to said vertical coil, said bilaterally conductive switch means having another terminal coupled to said source and being actuatable to connect said source to said vertical coil, and means for actuating said bilaterally conductive switch means to connect said source to said vertical coil at intervals corresponding to the horizontal scan intervals of said deflection system, whereby energy supplied from said source to said vertical coil during said horizontal scan intervals cooperates with the inductance of said coil to generate the desired correction waveform within said coil.

* * * * *